C. R. McKIBBEN.
PIPE JOINT.
APPLICATION FILED NOV. 6, 1909.

972,119.

Patented Oct. 4, 1910.

WITNESSES:

INVENTOR
C. R. McKibben
ATTORNEY

UNITED STATES PATENT OFFICE.

CHARLES R. McKIBBEN, OF PITTSBURG, PENNSYLVANIA.

PIPE-JOINT.

972,119.  Specification of Letters Patent.  Patented Oct. 4, 1910.

Application filed November 6, 1909. Serial No. 526,539.

*To all whom it may concern:*

Be it known that I, CHARLES R. MCKIBBEN, a citizen of the United States, residing at Pittsburg, in the county of Allegheny and State of Pennsylvania, have invented or discovered new and useful Improvements in Pipe-Joints, of which the following is a specification.

My invention relates to pipe-joints in which the members are connected together both by their mechanical features and by what is commonly called autogenous welding.

The object of my invention is to make a pipe-joint held in place very rigidly without requiring the welded surfaces to bear such a large part of strains which tend to rupture the joint, as in the ordinary autogenously welded joints.

Figure 2:
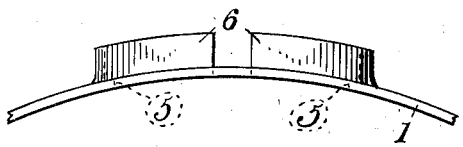
Figure 3:
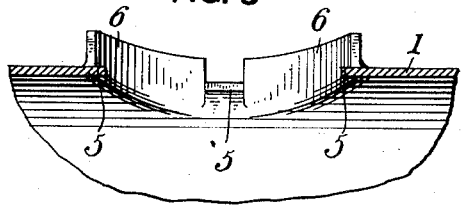
Figure 5:
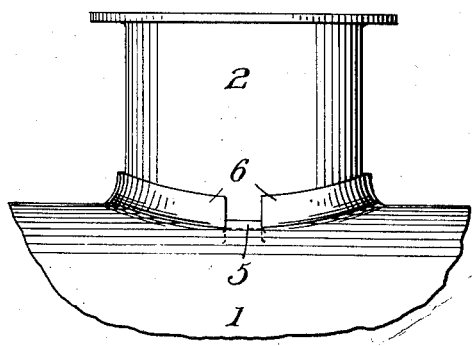
Figure 4:
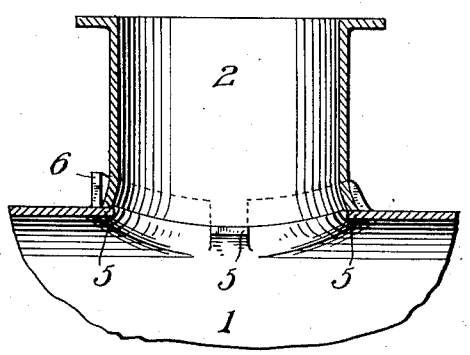
Figure 6:
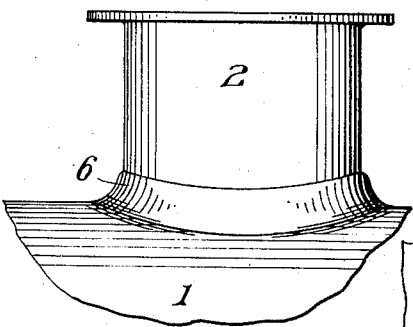
Figure 1:
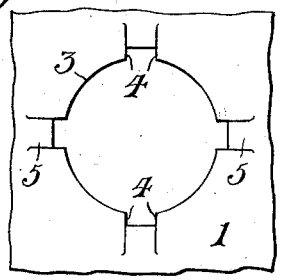

Referring to the accompanying drawing, in which I have shown my invention applied to the welding of two tubular bodies at right angles to each other, Figure 1 is a plan of a portion of the main tube as it is at the initial part of the process of making a joint; Fig. 2, shows the side elevation, the next step in the said process; Fig. 3 is a central vertical section of Fig. 2; Fig. 4, a vertical section like Fig. 3 but with the branch pipe seated on the main pipe and with one of the flanges of the latter bent down against the branch pipe; Fig. 5 is an elevation showing the assembled joint just previous to the welding operation; Fig. 6 is an elevation showing the welding completed; and Fig. 7, a vertical section showing a portion of the welded joint.

Figure 7:
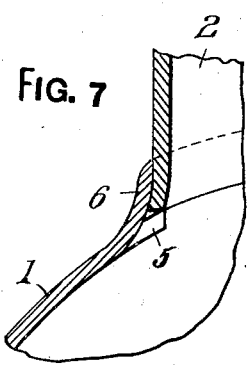

On the drawing, 1 represents the main pipe to which the branch pipe 2 is to be welded. In the pipe 1, I form the hole 3 with which the pipe 2 is to register and cut a number of pairs of parallel slits 4 in the edge of the opening 3, providing the tongues, rests or lugs 5. I find four of these tongues arranged 90° apart to be satisfactory for most purposes but the number and arrangement of the same may be varied. The metal between successive tongues is bent in any desired manner so as to project outwardly as shown in Fig. 3 forming the flanges 6 concentric with what would be the axis of the pipe 2, if it were in place as shown in Fig. 4. The lower end of the pipe 2 is cut so as to conform to the shape of the opening within the flanges 6 and just above the tongues 5, as shown in Figs. 4 and 5. Preferably the lower end of the pipe 2 will be flared as shown in Figs. 4 and 7.

The metal about the opening 3 is heated before the flanges 6 are formed in order to facilitate their formation. While the metal is still hot the pipe 2 is placed in position as shown in Figs. 4 and 5 and the flanges 6 are then bent down against the side of the pipe 2, as shown in Fig. 5, and at the right-hand side of Fig. 4, the left-hand side thereof showing the flange 6 as it is before it is bent against the tube 2.

The metal of the flanges 6 and of the tube 2 above and between the flanges 6 and at the base of the tongues 5 is highly heated by blow-pipe flame or other heat so as to bring the said metal to the point of fusion, at which time metal is melted by the flame and applied to the edges above the flanges 6 and between the same so as to entirely weld the pipes 1 and 2 together by their own and the added metal. Any method of autogenous or other welding may be used as I make no claim to the particular manner in which the welding itself is accomplished.

My invention is obviously not confined to the joining of two tubular bodies, as it may be applied to a plane and a tubular body or to two plane bodies. The shape of the bodies joined is not essential as my invention lies in the use of the tongues and flanges in connection with the welding operation.

I claim—

1. A joint composed of two members arranged at an angle to each other, one member having tongues on which the other rests, and a flange against which the face of the other rests, said members being welded together.

2. A joint composed of main and branch tubular members, the main member having tongues on which the end of the branch member rests, and flanges between successive tongues, arranged to surround and fit against the outer face of the said end of the branch member, said members being welded together.

3. A joint composed of main and branch tubular members, the main member having tongues on which the end of the branch member rests, and flanges between successive tongues, arranged to surround and fit against the outer face of the said end of the branch member, said branch member having the end thereof next to the said tongues flared and said members being welded together.

Signed at Pittsburg, Pa., this 25th day of October, A. D. 1909.

CHARLES R. McKIBBEN.

Witnesses:
F. N. BARBER,
M. A. BARTH.